US010185982B1

(12) United States Patent
Kane-Parry

(10) Patent No.: US 10,185,982 B1
(45) Date of Patent: Jan. 22, 2019

(54) SERVICE FOR NOTIFYING USERS OF ITEM REVIEW STATUS CHANGES

(71) Applicant: Amazon Technologies, Inc., Seattle, WA (US)

(72) Inventor: David James Kane-Parry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 802 days.

(21) Appl. No.: 14/667,196

(22) Filed: Mar. 24, 2015

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0282* (2013.01); *G06Q 30/0603* (2013.01)

(58) Field of Classification Search
CPC ....... G06Q 30/0601–30/0645; G06Q 30/0631; G06Q 30/0603; G06Q 30/0282
USPC ....................................... 705/26.1–27.2, 14.5
See application file for complete search history.

(56) References Cited

U.S. PATENT DOCUMENTS

| | | | | |
|---|---|---|---|---|
| 6,438,579 | B1 * | 8/2002 | Hosken | G06F 17/30867 707/999.002 |
| 7,389,294 | B2 | 6/2008 | Kotas et al. | |
| 7,483,846 | B1 | 1/2009 | Kumar et al. | |
| 8,145,512 | B1 * | 3/2012 | Henne | G06Q 10/063 705/7.11 |
| 8,326,658 | B1 * | 12/2012 | Lee | G06Q 30/0603 705/7.11 |
| 8,484,099 | B1 * | 7/2013 | Pope | G06Q 30/016 705/26.7 |
| 2001/0021914 | A1 * | 9/2001 | Jacobi | G06Q 30/02 705/14.53 |
| 2007/0288468 | A1 * | 12/2007 | Sundaresan | G06F 17/30867 |
| 2009/0094095 | A1 * | 4/2009 | Slaney | G06Q 10/10 705/7.29 |
| 2009/0192808 | A1 * | 7/2009 | Sela | G06Q 30/02 705/1.1 |
| 2012/0101918 | A1 * | 4/2012 | Battle | G06Q 30/00 705/26.63 |

(Continued)

*Primary Examiner* — Yogesh C Garg
*Assistant Examiner* — Matthew J Kaufmann
(74) *Attorney, Agent, or Firm* — Knobbe, Martens, Olson & Bear, LLP

(57) ABSTRACT

The present disclosure provides computer-implemented systems and processes for determining and analyzing a user review status for a first item purchased or otherwise selected by a user; automatically and periodically monitoring review statutes for various alternative items, which may include competing, substitute, or replacement items relative to the first item; and generating an item recommendation based at least in part on a determination of which alternative items may be more positively rated than the first item. When a determination is made that an alternative item may be earning more positive feedback than the first item of interest, the system notifies the user that a possibly better item is available. Candidate alternative items may be identified based on the user's browsing history, groups of related items, or other sources. Candidate items may be weighted based on various attributes of the reviews, including average rating, number of ratings, number of reviews, and type.

13 Claims, 4 Drawing Sheets

(56) References Cited

U.S. PATENT DOCUMENTS

| | | | | |
|---|---|---|---|---|
| 2012/0109778 | A1* | 5/2012 | Chan | G06Q 30/02<br>705/26.7 |
| 2012/0316986 | A1* | 12/2012 | Levy | G06Q 30/00<br>705/26.7 |
| 2013/0066819 | A1* | 3/2013 | Nice | G06F 17/30029<br>706/14 |
| 2013/0084000 | A1* | 4/2013 | Bhardwaj | G06Q 30/0643<br>382/165 |
| 2013/0196297 | A1* | 8/2013 | Anwar | G06F 19/3475<br>434/236 |
| 2013/0283307 | A1* | 10/2013 | Avedissian | G06Q 30/0214<br>725/23 |
| 2014/0304277 | A1* | 10/2014 | Veugen | G06Q 30/02<br>707/748 |
| 2015/0095185 | A1* | 4/2015 | Katukuri | G06Q 30/0631<br>705/26.7 |

* cited by examiner

*1000*

Catalog.com  Hello, Chris Customer                          Your Account | Help

| Shop All Departments | Search [▼] [_____] (GO) | Cart [▼] |

On November 1, 2014 You Purchased:

[Item A Image]

(1) 60" Super HD Television
Price: $1,999.99
Average Rating: ★★★ (150 Reviews)
Delivered: November 5, 2014
Order Number: 123-456789-0

⎫
⎬ *1002*
⎭

*Since you purchased this item, customers have rated or reviewed the following items more positively*

[Item B Image]   Alternative Item B      [Add To Cart]
                 From:  $1799.99         [Add To Wishlist]
                 ★★★★ (400 Reviews)

*What others are saying:*
"... I bought the 60" Super HD Television but had to return it. Instead of a replacement unit I bought this one instead and never looked back!" - Happy Customer

[Item C Image]   Alternative Item C      [Add To Cart]
                 From:  $1699.99         [Add To Wishlist]
                 ★★★★ (450 Reviews)

*What others are saying:*
"... The 60" Super HD Television was great for a while, but this one had a lot of additional features, is easier to use, and cost less, so I switched..." - Converted Customer

⎫
⎬ *1004*
⎭

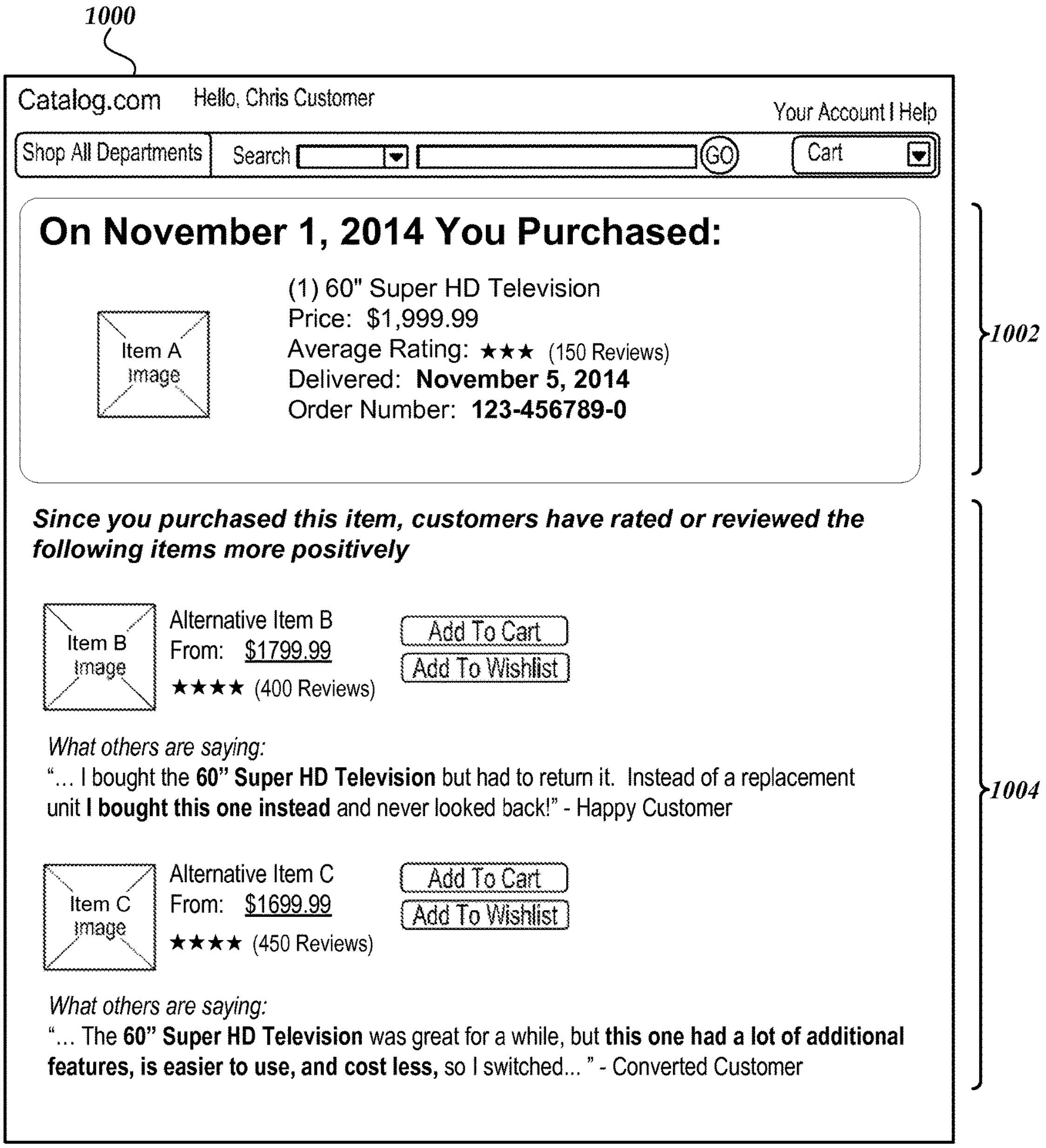

*FIG. 1*

SERVICE FOR NOTIFYING USERS OF ITEM REVIEW STATUS CHANGES

BACKGROUND

Network sites and other types of interactive electronic catalog systems commonly include recommendation systems for providing recommendations of items such as items that are available for download and/or purchase. The recommendations are typically generated based on monitored user activities or behaviors, such as item purchases, item viewing events, item play events, item rentals, and/or other types of item consumption actions. In some systems, the recommendations are additionally or alternatively based on users' explicit ratings of items.

BRIEF DESCRIPTION OF THE DRAWINGS

FIG. 1 is a pictorial diagram of an example user interface that illustrates an item order summary page including item recommendations for one or more alternative items determined to have received higher customer reviews, involving an interactive system, such as the interactive system of FIG. 4

DETAILED DESCRIPTION

Overview

Figure 2:
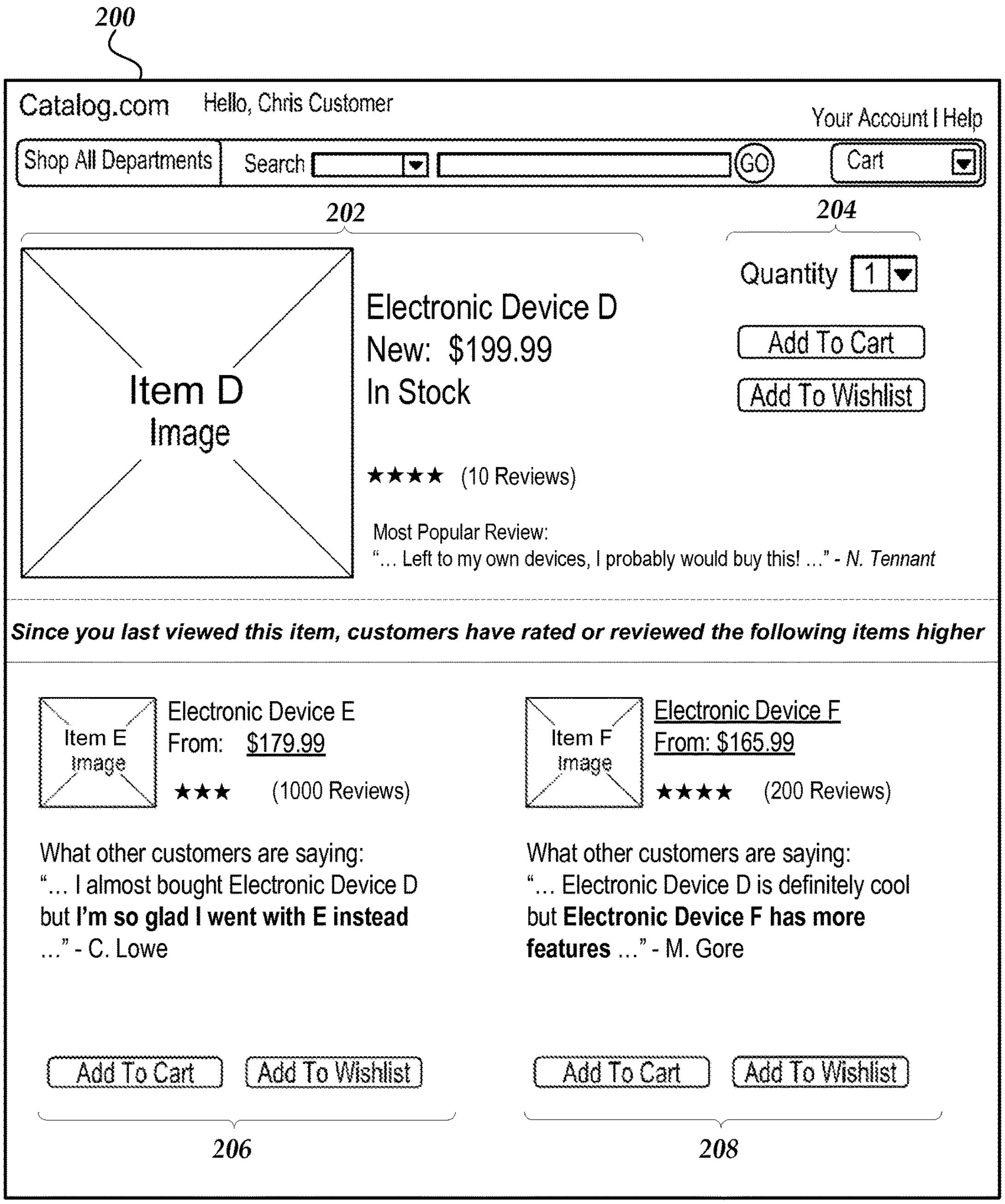
FIG. 2 is a pictorial diagram of an example user interface that illustrates an item detail page including item recommendations for one or more alternative items determined to have received higher customer reviews, involving an interactive system, such as the interactive system of FIG. 4

Several different computer-implemented processes will now be described for providing item notifications, including item recommendations, based on changes in their review statuses after a competing item was purchased, viewed, added to a wishlist, or otherwise determined to be of interest to users. These processes may be embodied individually or in any combination in a multi-user computer system ("system"). A recommendation engine capable of ranking, re-ranking, and selecting items to recommend to a user based on a set of source items may also be used.

According to the systems and processes described herein, when a user purchases an item (or performs another type of selection action, such as viewing the item, adding the item to a wish list or shopping cart), a record may be made of the item's review status, including the number of positive reviews, the average rating, and other relevant data to be determined. The system may periodically monitor and determine when an alternative item (such as a competitor item or other substitute item) earns more positive reviews or a higher average rating than the item the user purchased. When a determination is made that one or more alternative items may have received more positive customer feedback than the item the user purchased (or otherwise selected for acquisition), the system alerts the user that an alternative, possibly better item is available.

Among other benefits, users whose purchasing decisions are often based on other customer's reviews would like to know when better competing items are available, based on customer reviews and other feedback over time. In some cases, after a user makes a purchase, the user may not check to see if a better item is available unless the user becomes dissatisfied with the item and wishes to find an alternative or replacement. Thus, an interactive system as described herein can proactively alert the customer to potentially better items based on customer reviews, which can improve the user's trust in and general reliability of customer reviews.

In some embodiments, the interactive system may provide alternative item notifications, which may comprise item recommendations, to the user based on the user's browsing history, whether or not the user purchased the items browsed. For example, if the user is browsing and evaluating competing items, the user may benefit from knowing that, from the time the user previously viewed an item of interest to the current time, one or more of the competing items are trending upward in customer feedback. This may be particularly valuable in various instances, such as when the user has added the item of interest to a shopping cart or a wish list and has not yet purchased the item. Often the user will not revisit or review other customer reviews before finalizing the purchase, in which case the user may benefit from knowing that one or more competing items are now rated more favorably (or have been trending upward) since the user last visited or viewed the item of interest. The notifications may also be useful where the user has already purchased the item, as the user may wish to return or sell it in favor of a more desirable alternative item.

In some instances, the user may be provided an option to subscribe to such item notifications, for example during or after a checkout process, wherein the user may indicate an interest in being notified if a better or more positively reviewed item is released or increases in popularity. For example, a checkout or order confirmation page may provide a checkbox for the user to subscribe to such item notifications. Or, in another example, the user may be provided an option to subscribe to such item notifications, for example, for a certain period of time in order to stay informed of whether a particular item of interest (for example, an item added to a wish list) remains relatively more positively reviewed and/or if any alternative items become more positively reviewed.

The interactive system may be configured to determine, for a base item (e.g., a particular item or item of interest) purchased or otherwise selected by a user, a review status (e.g., average rating, number of ratings, number of user reviews, type of user reviews such as favorable/positive, neutral, unfavorable/negative, etc.) at the time the base item was purchased or otherwise selected by the user. The system may then automatically and periodically monitor one or more alternative items to determine whether the review statuses of those alternative items are improving over time (and/or better at a point in time) than the review status of the base item at the time it was purchased or otherwise selected. In some instances, the system may automatically and periodically monitor the base item to determine whether the review status of the base item has declined and/or is worse than the review status of the base item at the time it was purchased or otherwise selected. Such downward-trending review status information may be of interest to the user, either alone or in combination with the upward-trending information associated with alternative items.

When a determination is made that one or more of the alternative items appears to have a better or otherwise more favorable review status than the base item had at the time it was purchased or otherwise selected, a notification and/or an item recommendation may be generated and provided to the user. The notification or item recommendation may be provided in various ways, such as an email sent to the email address associated with the user account, or in a popover or other message displayed in a web page provided by the interactive system when the user browses the electronic catalog or accesses his user account. The message (e.g., "You recently viewed Item X. You might be interested in Item Y, which has received more positive customer feedback since your last visit") may be displayed, for example: on any home or landing page which the user first sees upon returning to browse the electronic catalog; on an item detail page for the base item or for one of the alternative items; on an order detail or order history page; on a shopping cart page which may include the base item in the shopping cart or saved for later; on a wish list page, which may include the base item; a search page, which may include the base item or one or more of the alternative items; a category browse page by which the user may browse categories of items available from the electronic catalog; in an advertisement, including an advertisement provided as part of a video or audio content stream; or via a mobile application or an associated push notification.

The interactive system may determine which alternative items to periodically monitor based on a variety of criteria. For example, in some instances, alternative items may be determined based on a browsing history associated with the user. For instance, before purchasing a base item, the user may have viewed or otherwise considered purchasing five alternative items. The interactive system may then periodically monitor these five alternative items and notify the user when the customer feedback of any of those five alternative items improves or is better than the item the user purchased. Similarly, browsing history and/or a wish list may be used as source items for such monitoring even if the user did not yet purchase any of the items. For example, a user shopping for a new television might add five different television items to a wish list for later consideration; the interactive system may automatically monitor these five television items and notify the user when the review status of any of those five improves favorably, relative to each other and/or relative to the last time the user viewed the items. The user's browsing history may be utilized in other ways as well; for example, items in the user's browsing history may receive a higher weighting or ranking for item recommendations based on a determination that those items have received better or more favorable user feedback.

The interactive system may determine which alternative items to periodically monitor based on other criteria, including but not limited to: browsing histories of multiple users (e.g., to identify groups of related items which users in general may browse together); item attributes (e.g., to identify items which may be related based on similar attributes, such as categories, types, prices, and so on); and any other approach to determine groups of items which may be substitute, competing, replacement, or otherwise alternative items to items which the user has purchased, viewed, added to a wish list, added to a shopping cart, or otherwise considered.

The features described herein may provide a number of benefits and practical uses for the users of the electronic catalog system. For example, in certain embodiments, users may be notified of, and/or otherwise be able to quickly and readily determine, whether newer editions or versions of items (such as books, movies, applications, some consumer devices, and other items which receive product refreshes on a regular basis) they have previously purchased have received more favorable user feedback relative to the older edition or version they own or previously rented. Such information may be useful to the user, who may not otherwise be aware that either a new edition is available or that the newer version includes improvements of features which other users have responded to favorably. As another example, users may have access to information about a series of related items (such as series of books, movies, television episodes, podcasts, periodical, and the like) such that items occurring later in the series may have received more favorable user feedback than items earlier in the series. Such information may be useful to the user, who may, for example, initially dismiss a series which had a "rocky" or unfavorably received start which improved over time with subsequent installments in the series.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Example User Interfaces

Figure 4:
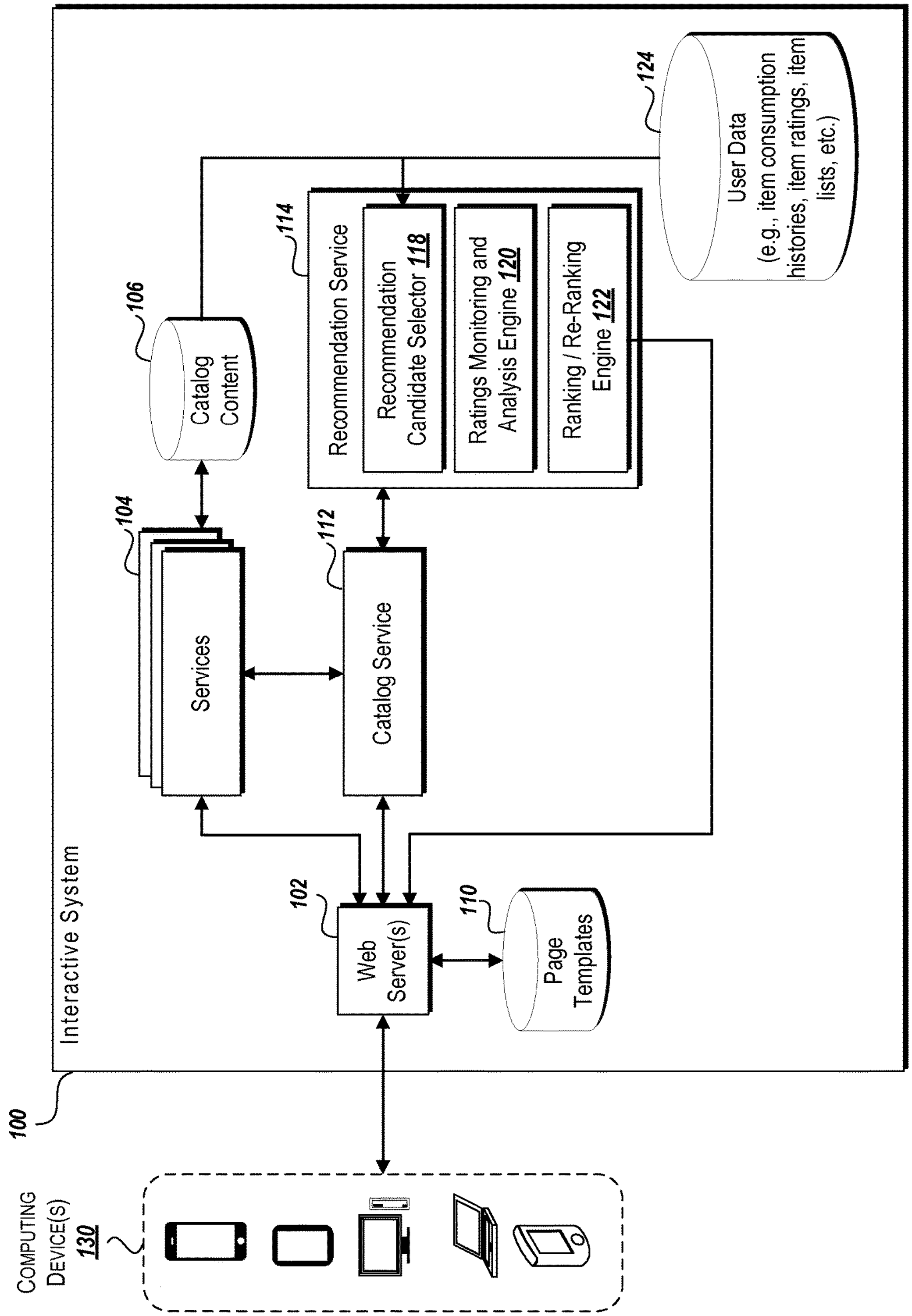
FIG. 4 schematically illustrates an embodiment of an interactive system that implements analysis of user ratings for alternative items and related processes, which may be used to, among other things, provide or improve item recommendations to users.

FIGS. 1 and 2 illustrate sample user interfaces that may be generated by or used with an interactive system, such as the interactive system 100 of FIG. 4. In various embodiments, each of the user interfaces shown in FIGS. 1 and 2 may be presented as a web page, as a mobile application display, as a stand-alone application display, as an email message, as a text message (for example, a short message service (SMS) or a multimedia messaging service (MMS) message) or by other communication means. In other embodiments, analogous interfaces may be presented using audio or other forms of communication. In an embodiment, the interfaces shown in FIGS. 1 and 2 are configured to be interactive and respond to various user interactions. Such user interactions may include clicks with a mouse, typing with a keyboard, touches, and/or gestures on a touch screen, voice commands, and/or the like. The application interfaces may be generated by the web server 102 (FIG. 4) using a repository of page templates 110, or by a mobile application, installed on the computing device 130, that is provided in association with the interactive system 100.

FIG. 1 is a pictorial diagram of an example user interface ("UI") 1000 that illustrates an item order summary page including item recommendations for one or more alternative items determined to have received higher, more positive, or otherwise more favorable customer reviews, involving an interactive system, such as the interactive system of FIG. 4. The order summary page shown in user interface 1000 may be provided to the user in various ways, including for example as a web page provided by the interactive system 100 as part of an electronic catalog, which may be generated as part of an order history associated with a user account of the user. In another instance, the order summary page shown in user interface 1000 may be provided as part of an email message sent to the user. For example, the interactive system 100 may be configured to periodically monitor customer feedback (e.g., ratings and reviews) for a base item purchased by the user, and/or for one or more alternative items related to the base item, and when a determination is made that one or more alternative items have or tend to be receiving more favorable customer feedback, an email message comprising some or all of the elements shown in user interface 1000 may be generated and provided to the user.

The order summary page, or portions thereof, may also or alternatively be displayed as part of an item detail page, such as the example item detail page illustrated and described with reference to FIG. 2. For example, if the user accesses an item detail page for "Item A" which the user has previously purchased, some or all of the user features presented in user interface 1000 may be provided.

As shown in FIG. 1 at user interface feature 1002, "Item A" may, for example, be a particular television which the user previously purchased. The example user interface feature 1002 includes an image of the item, a brief description of the item (for example, title, price), an average rating of the item, and order information including a date of when the item was ordered, a date of when the item was delivered (or, if not yet delivered, a projected delivery date), and an order number.

User interface feature 1004 presents a listing of alternative items which may be available for purchase, along with some customer review information (for example, ratings, portions or snippets of favorable customer reviews, etc.), which may be generated by the interactive system 100 as part of the processes and methods described herein (for example, described with reference to FIG. 3). For example, user interface feature 1004 presents item recommendations for "Alternative Item B" and "Alternative Item C," along with a descriptive message for the user indicating that customers have rated or reviewed these items higher or more positively than the one purchased by the user.

The determination of whether Alternative Item B and Alternative Item C should be provided as an item recommendation may be based on a variety of criteria, as discussed in more detail throughout this disclosure. For example, the interactive system 100 may record or otherwise be able to determine the customer review status for Item A at the time it was purchased by the user, and further determine the customer review statuses for Items B and C (and other items) on a periodic basis (for example, to determine if there is an upward trend in favorable customer feedback, or to determine if the alternative items have surpassed Item A in terms of favorable customer feedback, and so on). A list of candidate items, review statuses of which may be periodically monitored and analyzed by the interactive system 100, may be based on a variety of factors, including but not limited to other items the user may have viewed and/or considered before purchasing Item A; other items which are determined to be related, competing, or substitute items; and/or other items which may be complementary, of which the user may benefit from being.

FIG. 2 is a pictorial diagram of an example user interface ("UI") 200 that illustrates an item detail page including item recommendations for one or more alternative items determined to have received higher, more positive, or otherwise more favorable customer reviews, involving an interactive system, such as the interactive system of FIG. 4. "Item D" may, for example, be an electronic device, a book, an electronic book, a movie, music download, consumer product, or any other product or service available from an electronic catalog system. In other environments, the item represented on the item detail page may, for example, be a news story, a news feed, a web site, a blog, a music content item, a video content item, a restaurant, a service, a service provider, or other type of item. In the particular example shown in FIG. 2, "Item D" is an electronic device with a list price of $199.99. Item D may be, for example, an item that the user has purchased, or an item that the user has only viewed, added to a wish list, or otherwise may be considering purchasing.

The example user interface feature 202 includes an image of the item and a brief description of the item (for example, title, price, and whether the item is in stock). User interface feature 204 includes input controls selectable by Chris Customer to specify a number of items for purchase, and to add the item to a shopping cart or to a wishlist. User interface features 206 and 208 reflect alternative items which may be available for purchase, along with customer review information (for example, ratings, portions or snippets of favorable customer reviews, etc.), which may be generated by the interactive system 100 as part of the processes and methods described herein (for example, described with reference to FIG. 3).

For example, user interface feature 206 presents an item recommendation for "Item E," another electronic device which the interactive system 100 has determined has received relatively higher or more positive customer feedback than "Item D" presented at user interface feature 202. Similarly, user interface feature 208 presents an item recommendation for "Item F," another electronic device which the interactive system 100 has determined has received relatively more positive customer feedback than "Item D." The item recommendation of Item E provided at user interface feature 206 illustrates that the determination of whether an item has received relatively more positive customer feedback than the base item ("Item D") may be based on more than just the average user rating. For example, although Item E has a lower average user rating (three stars) than Item D (four stars), Item E may nevertheless be selected as an item recommendation based on other criteria, such as the number of reviews (Item E has 1000 reviews compared to Item D's 10 reviews). As another example, the item recommendation of Item F provided at user interface feature 208 illustrates that the determination of whether an item has received relatively more positive customer feedback than the base item ("Item D") may be based on information contained in the content of the user review (e.g., Item F has "more features" and Item D).

The types of information presented in FIGS. 1 and 2 may be displayed or presented in a variety of contexts. For example, when a user is viewing a wishlist of items, then some of the item notification information may be presented alongside those relevant items in the list. The user interfaces 1000 and 200 include a number of distinct areas that can be used to display user interface features that contain various types of content. The example user interface features (e.g., 1002 and 1004 illustrated in FIG. 2; and 202, 204, 206, and 208 illustrated in FIG. 2) are intended to schematically illustrate certain types of user interface features that can be used on an example user interface, but are not intended to be limiting. For example, the content, appearance, positioning, sizes and so forth of the user interface features may be different than shown. Certain user interface features shown in user interfaces 1000 and 200 may be omitted, displayed or arranged differently. Other variations on the user interfaces 1000 and 200 may also be possible. For example, user interface 1000 may include user features or information suggesting that the user may wish to trade in the previously purchased item for one of the recommended alternative items.

Figure 3:
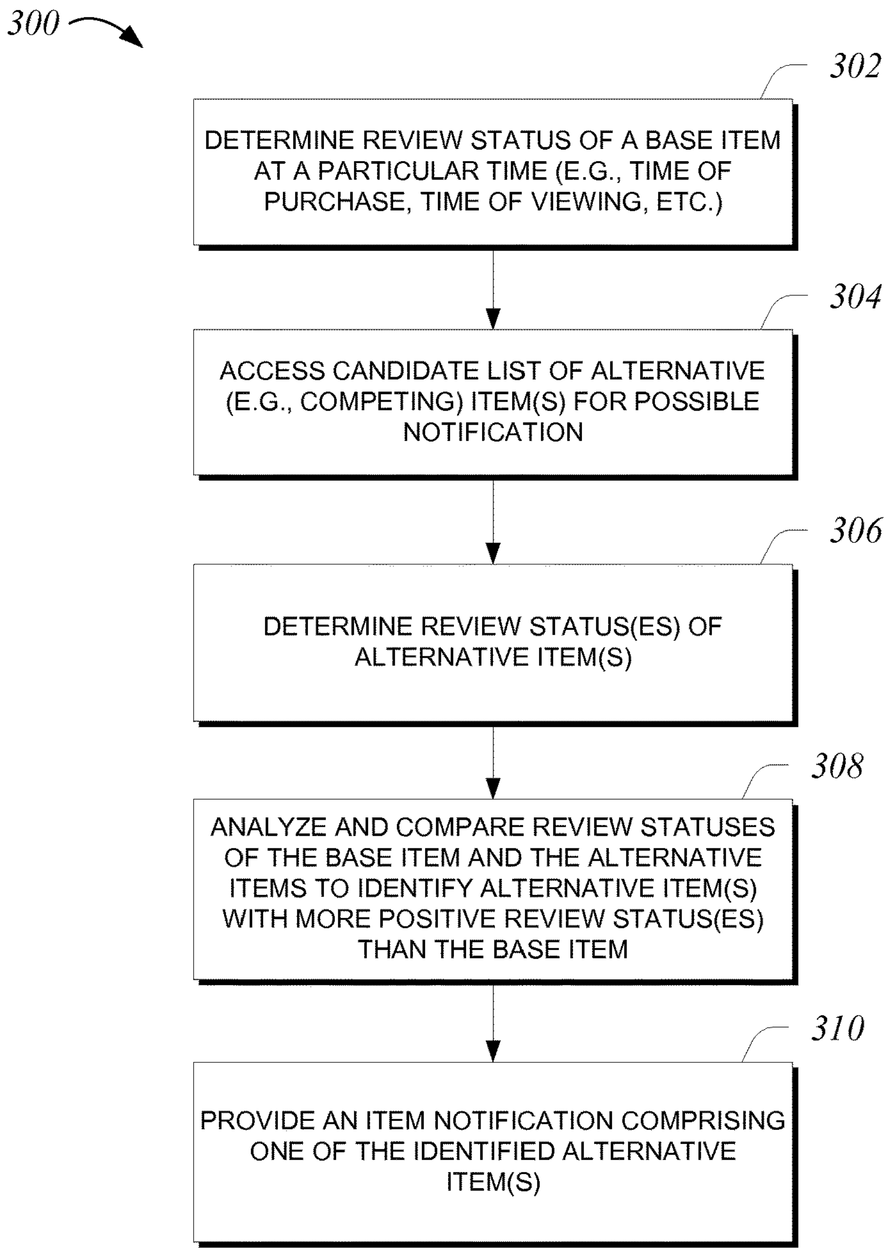
FIG. 3 is a flow diagram of an example method for determining and analyzing user review status(es) for a first or "base" item purchased or viewed by a user and various alternative items, and generating an item recommendation based at least in part on a determination of which alternative items may be more favorably rated than the base item, as implemented by an interactive system, such as the interactive system of FIG. 4.

Example Process for Generating an Item Recommendation Based on a Determination of which Alternative Items May be More Positively Rated than a Base Item FIG. 3 is a flow diagram of an example process 300 for determining and analyzing user review status(es) for a base item purchased or otherwise selected by a user and various alternative items, and generating an item recommendation based at least in part on a determination of which alternative items may be more positively or higher rated than the base item, as implemented by an interactive system, such as the interactive system 100 of FIG. 4.

At block 302, the process 300 determines a review status associated with a base item at a particular time. For example, the review status may be determined at a particular time, such as when a user purchased the base item, or at a time when the user last viewed the base item (such as during a browsing session in which the user may not have necessarily purchased the item). The review status may be determined and stored at the particular time of interest (e.g., when purchased or otherwise selected), or determined by the interactive system 100 at any other time based on a stored history of user review data. The review status may be stored and accessed from, for example, the repository of catalog content 106 (FIG. 4). In other embodiments, the review status may be stored and accessed from a third party entity or other content information source provider which stores reviews, ratings, and similar information that might be provided by, for example, a consumer reports organization, a service provider that accepts and provides user-generated review content, and the like. The review status information may include, for example, a star rating, textual review, a thumbs up or down indicator, or other indicator of the quality of the item, in any combination.

The review status information may be stored by the interactive system 100 in a variety of ways in order to optimize storage efficiency. For example, in some embodiments, the interactive system 100 may only store an aggregate review status or score for a particular point in time to reduce or minimize the number of review status data points and other attributes which need to be stored in a historical review status database. In some cases, as review status attributes or metrics are added or removed over time, a special tag or indicator may be added to the aggregate review status to, for example, indicate a certain review metric was not in use or available at the point in time that the aggregate review status was determined. These tags or indicators may be used to re-weight the review status at a point in time if, for example, a newer or more reliable review metric or attribute is used and the older aggregate review status may be relatively less reliable.

At block 304, the process 300 accesses a candidate list of alternative items for possible notification (such as a recommendation) for the user. The candidate list of items for possible notification may be based on, for example: a list of items viewed or accessed during a browsing session; a list of items identified as substitute, competing, replacement, or otherwise alternative items relative to the base item; and/or a wish list or other interest list associated with an account of the user, among other things. In some embodiments, the candidate list of items may be generated by the recommendation service 114 and may include additional items otherwise determined to be related to the base item or which the user may find of interest as an alternative to, or replacement of, the base item. The candidate list of items may be stored and accessed from, for example, the repository of user data 124 (FIG. 4). In some instances, the candidate list of items for possible recommendation may include items or lists of items provided or registered by merchants as items which may be alternative or competing items to the base item.

At block 306, the process 300 determines the review status(es) associated with the alternative item(s) on the candidate list. Review statuses may be determined based on, or otherwise include one or more review attributes including but not limited to, average user rating, number of ratings, number of user reviews, type of user reviews (which may be based on certain identified keywords) such as favorable/positive, neutral, unfavorable/negative, and the like. Review statuses may be for a particular point in time, or for many points in time such that trends in the review statuses over time may be determined and analyzed. The review statuses may be automatically determined on a periodic basis (e.g., daily, weekly, monthly, or any other period of time) by the process 300 in order to determine when review statuses have changed (for better or for worse). The review statuses associated with the alternative items may be accessed from, for example, the repository of catalog content 106.

As another example, the review status may be determined by the interactive system 100 by calculating deltas or changes in the review status relative to a particular origin date. Such an approach may be more computationally intense but require less data storage overall. Optimization of this determination may take into account that calculating deltas may require more computational resources the further back or older the origin date is, and thus in some instances items may not be considered or removed from the candidate list if the respective origin date on which the review status is to be determined is older than a certain date.

At block 308, the process 300 analyzes and compares the review status(es) associated with the base item and the alternative item(s) to identify alternative item(s) with more positive or higher review status(es) relative to the base item. This analysis can be based on a variety of factors. For example, any of the factors or review attributes associated with the review status of each item may be analyzed, compared, and weighted, including for example the average user rating, number of ratings, number of user reviews, comparative reviews (such as reviews for a base item in which the user mentions or compares the base item to an alternative item), and the type of the reviews. Additional information about the item may also be used, including for example whether the item has been subject to a recall or other information which may be an indicator of the quality of the item. In some instances, a first alternative item with a higher number of ratings may receive a higher weighting than a second alternative item with a lower number or ratings but a higher average user rating (such as the example shown in FIG. 2). This is because, for example, in some cases an average rating over a larger number of reviews may be more reflective of an actual average for a population than an average rating over a small number or reviews.

In some embodiments, reviews associated with particular features of the items may also be considered in the analysis. Features for which the user may have indicated an interest (either expressly or indirectly, such as might be indicated by the user's browsing history, the user highlighting certain portions of the text, cursor dwell positions while browsing, eye gaze behavioral data, and other types of interaction data) may receive a higher weighting than features for which the user may be less interested. For example, for an electronic device the user may be interested specifically on how well a wireless connectivity feature works, and thus user reviews or ratings of the wireless connectivity feature may receive a higher weighting in determining which alternative item to recommend to the user.

In some embodiments, the actual content of user reviews may also be analyzed, parsed, or otherwise scanned to identify certain keywords or phrases which may be indicative of the overall review status. For example, user reviews may contain positive or negative keywords, may describe specific features of the item, or may even compare the item to other alternative items or the base item (e.g., comparative item reviews). The scanned user review content may provide further input for weighting certain items more or less for the item recommendation ranking and/or selection. For example, a particular alternative item which has a number or reviews which consistently reference the base item as an inferior item, or which consistently reference or describe a particular feature of interest to the user in positive terms, may receive a higher weighting to improve the probability of selection as an item recommendation for the user.

At block 310, the process 300 provides an item notification comprising one of the identified alternative item(s) identified at block 308. For example, the item notification recommendation may be provided to the computing device 130 (for example, via a browser or application running on the computing device 130). The user interfaces shown in FIGS. 1 and 2 illustrate a couple of example user interfaces which may be configured to display the item notification, for example as an item recommendation, in association with the process 300. For example, in one embodiment, the item recommendation may be displayed in an item order detail page for an item purchased by a user (FIG. 1) when a determination is made that one or more alternative items have received more favorable customer feedback than the item ordered by the user. Or, in another example embodiment, the item recommendation may be displayed in an item detail page for an item viewed by the user (FIG. 2) when a determination is made that one or more alternative items have received more favorable customer feedback than the item viewed by the user since the user last viewed the item.

Example System

FIG. 4 schematically illustrates one embodiment of an interactive system 100 that implements the above and other features described herein. The interactive system 100 may be implemented as a computerized system that comprises multiple programmed computing devices (for example, web server machines, application servers, storage servers, load balancers, etc.) that communicate over one or more networks. The interactive system 100 hosts a web site that provides functionality for users to browse an electronic catalog of items that are available for purchase or rent. The items represented in the catalog may include, for example, physical products; music, video, or game downloads or content available for streaming (including live video and/or video gameplay streaming, such as Twitch); electronic book downloads; software applications; magazine subscriptions; mobile service plans; and other types of items that can be purchased or rented. Although described in the context of a web site, the inventive features described herein can also be implemented in other types of interactive systems, including interactive television systems. Further, although described in the context of products that are available for purchase or consumption, the disclosed features are also applicable to other types of items, including services, news articles, blogs, web sites, and television shows.

The web server 102, which may include any number of physical servers, dynamically generates web pages and user interfaces in response to requests from the user computing devices 130 (for example, personal computers, laptops, portable computing devices, mobile phones, electronic book readers, PDAs, tablets, etc.). The web pages can be generated using a repository of web page templates 110, using data retrieved from a set of services 104. The types of services 104 can vary widely, and may include, for example, a search service that processes search queries including free-form search strings submitted by users, a tag service that allows users to tag items, and a transaction processing services that processes purchases and/or other types of transactions.

The interactive system 100 also includes a repository of catalog content 106. The catalog content may include, for example, item images, item descriptions, item details, item categories, item relationships, user ratings and reviews of items, price and availability data, seller data, author pages, user-generated list pages, forum pages, blog pages, and the like. The item information in this repository may be viewable by end users through a browsable electronic catalog in which each item may be described in association with a corresponding network page, which can be referred to as an item detail page. Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques. An item detail page may be associated with one or more uniform resource identifiers ("URIs") that may be interpreted by a browser or other program operating on a computing device in order to present the item details, request the page information from a server or other system, or the like.

The interactive system 100 also includes a catalog service 112 that returns catalog data for particular items. The catalog service 112 provides access to catalog content 106. In one embodiment, at least some of this content is arranged in a hierarchical structure, having items associated with one or more categories or browse nodes in a hierarchy. The catalog service 112 can provide functionality for users to browse pages in the item hierarchy in addition to searching the catalog. Users can select an item represented in the hierarchy or in a list of search results to view more details about an item.

The interactive system 100 also includes a recommendation service 114 that performs and provides the item notification and recommendations services described herein, including accessing and/or generating recommendation candidates and ranking (or re-ranking) the candidates based at least in part on comparison of user reviews and other criteria as described herein. For example, the recommendations service 114 may be configured to execute certain aspects of the process 300 described herein. The recommendation service 114 may provide item notifications or recommendations to users automatically, or as part of a subscription service in which a user may indicate an interest in being notified if a better or more positively reviewed item is released or increases in popularity. In another embodiment, a third party entity or service may be able to subscribe to such item notifications and use the provided information in, for example, marketing campaigns and targeted advertising. For example, the user may be able to purchase an item from the interactive system 100 by way of a third party entity system or website, wherein the user uses the third party entity system or website to complete the purchase without navigating away from the third party entity system or website. Such a feature may make the item notification and purchase process seamless for the user and help retain customers in certain ecommerce environments.

The recommendations service 114 may include a recommendation candidate selector 118 that may be configured to generate or select one or more recommendation candidates to recommend to the user based on the user profile data 124. The recommendation candidates may have associated scores indicating a relative strength of relevance to the user. For example, the recommendation candidate selector 118 may select the N most highly scored candidates to recommend. Alternatively, the recommendation candidate selector 118 may select a different subset. For example, in some cases it can be beneficial to show recommendations that are not determined to be the best in order to provide fresh recommendations to the user, among other reasons. In certain embodiments, the recommendation candidates may comprise, for example, items which the user has added to a watch list or wish list, thereby indicating at least an initial level of interest by the user in the items.

The recommendations service 114 may also include a ratings monitoring and analysis engine 120. The ratings monitoring and analysis engine 120 may be configured to, for example, access or retrieve user ratings and other user review data (e.g., from the repository of catalog content 106 and/or the repository of user data 124), and analyze the ratings data to determine when one or more items have received better or more favorable user reviews than an item of interest to the user (e.g., an item purchased, viewed, added to a wish list, added to a shopping cart, or otherwise of interest to the user).

The ranking engine 122 may be configured to, for example, use the determined review status information from the ratings monitoring and analysis engine 120 to remove or re-arrange one or more of the recommendation candidates. The ranking engine 122 may use the determined review status information to update or re-rank an already-ranked set of items, or can rank the items if not already ranked (for example, to generate or determine an initial ranking of the set of items). For example, a particular candidate recommendation with a relatively lower score or ranking after the initial ranking is generated may receive a ranking "boost" or a ranking "downgrade" based on the determined relative review status. This may be of benefit to the user receiving the provided recommendations, as the user may be more interested in alternative items which have received more positive overall feedback, ratings, and reviews than an item previously purchased or otherwise selected by the user. In one embodiment, in order to improve performance and efficiency the results of the ranking output may be stored or cached on a per-item basis, such that the ranking engine 122 may be configured to, for a particular item, look up and evaluate the particular item's overall popularity or level of positive feedback relative to other alternative items regardless of the particular user that purchased (or viewed, accessed, showed an interest in, etc.) that item. In some instances, the ratings monitoring and analysis engine 120 may be configured to trigger re-calculation or re-ranking of the candidates in response to detecting a change in the review status of a particular item. The detected change in the review status may be based on one or more threshold values, such as a number of reviews, a change in the average rating up or down by a certain amount, a new review being added for an item which may be reviewed less than a given frequency (e.g., a new review for an item that receives an average of one review per month may be more interesting than a new review for another item that receives an average of one review per day), and so on.

User profile data store 124 may store, for example, item preference data reflective of actions performed by a user. These actions might include, for example, purchasing/consuming items, rating items, adding items to the user's wish list, providing data on the user's friends, tagging items, searching for items, and the like. The item preference data may include browse history data (for example, data on user searches, clicks, a category browsed by the user and the like), purchase history data, friends' data, tags data, and many other types of data.

In some embodiments, the interactive system 100 can be configured differently than shown in FIG. 4. Many variations and alternatives are possible, and no single component or group of components is essential or required to be present in every embodiment of the interactive system 100.

The interactive system 100 may also include functionality and components (not shown) for enabling users to perform various other types of functions, including but not limited to the following: (1) purchasing items selected from the electronic catalog, (2) creating wish lists of items selected from the catalog, and searching for and viewing the wish lists of other users, (3) conducting keyword searches for specific catalog items, (4) browsing the catalog using a browse category-based item browse tree, (5) creating personal profiles that are viewable by other users, (6) posting items for sale in the electronic catalog, (7) tagging specific catalog items and (8) posting customer reviews, recommendations and ratings of particular catalog items.

The various components shown in FIG. 4 may be implemented in an appropriate combination of hardware and software. For example, the web server 102 may be implemented using physical servers (with processors, memory, etc.) that are programmed with executable program code to respond to display page requests by generating and returning web pages. As a further example, the web server 102 could be implemented by virtual machines instances existing on one or more physical computing devices. The recommendation candidate selector 118, the ratings monitoring and analysis engine 120, and the ranking/re-ranking engine 122 may similarly be implemented using programmed physical servers, virtual machine instances, or general purpose computers.

In the environment shown in FIG. 4, a user of the interactive system 100 may utilize a user computing device 130 to communicate with the interactive system 100. The communication may occur via a communication network, such as the Internet or other communications link. Those skilled in the art will recognize that the user computing device 130 may be any of a number of computing devices that are capable of communicating over a network. For example, the user computing devices can include, but are not limited to, a laptop, personal computer, personal digital assistant (PDA), hybrid PDA/mobile phone, mobile phone, electronic book reader, digital media player, tablet computer, gaming console or controller, kiosk, augmented reality device, other wireless device, set-top or other television box, and the like.

The network may be any wired network, wireless network, or combination thereof. In addition, the network may be a personal area network, local area network, wide area network, cable network, satellite network, cellular telephone network, etc. or combination thereof. In addition, the network may be a personal area network, local area network, wide area network, cable network, satellite network, cellular telephone network, etc. or combination thereof. In addition, the network may be a personal area network, local area network, wide area network, over-the-air broadcast network (for example, for radio or television), cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or some other type of wireless network. The network can use protocols and components for communicating via the Internet or any of the other aforementioned types of networks. Protocols and components for communicating via the Internet or any of the other aforementioned types of communication networks are well known to those skilled in the art and are not described in more detail herein.

The interactive system 100 is depicted in FIG. 4 as operating in a distributed computing environment including several computer systems that are interconnected using one or more computer networks. The interactive system 100 may have a fewer or greater number of components than are illustrated in FIG. 4. Thus, the depiction of the interactive system 100 in FIG. 4 should be taken as example and not limiting to the present disclosure. For example, the interactive system 100 could implement various Web services components and/or peer-to-peer network configurations to implement at least a portion of the processes described herein.

The interactive system 100 is also responsible for providing communication with various user devices, such as user computing device 130. The communication provided by the interactive system 100 may include generating text and/or graphics, possibly organized as a user interface using hypertext transfer or other protocols in response to information inquiries received from the various user devices. The interactive system 100 may obtain information on available goods and services from one or more data stores, such as catalog content repository 106, as is done in conventional electronic commerce systems. In certain embodiments, the interactive system 100 may also access item data from other data sources, either internal or external to interactive system 100.

Conclusion

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various example logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:

an electronic data store configured to at least store review information for items available from an electronic catalog, wherein the electronic data store can receive submissions of reviews for items from users of the electronic catalog; and a computing system comprising one or more hardware computing devices, said computing system in communication with the electronic data store and configured to at least:

generate a web page though which one or more items can be purchased from the electronic catalog;

transmit the web page to a user device;

monitor interactions of a user with respect to the electronic catalog, the monitored interactions obtained via interaction devices, and the monitored interactions including one or more of user highlighting of portions of text included in the web page, cursor dwell positions within the web page, or user eye gaze behavior data;

determine, for a first item available from the electronic catalog, a review status at a particular time associated with a user interaction of the user with respect to the electronic catalog;

access a candidate list of one or more alternative items for possible notification to the user;

determine, for individual ones of the one or more alternative items on the candidate list, associated respective review statuses at a second time that is later than the particular time associated with the user interaction, wherein for the individual ones of the one or more alternative items a difference between a review status at the second time and a review status at an origin time associated with the individual alternative item is computed, and wherein a particular alternative item on the accessed candidate list is discarded based on an origin time associated with the particular alternative item being older than a threshold, such that computational resources associated with computing the differences can be conserved;

compare the review status determined for the first item to the review statuses determined for the one or more alternative items to identify, from the one or more alternative items and based on the monitored interactions of the user, at least one selected alternative item having an associated review status more positive than the review status of the first item;

receive, from the user device at a third time that is later than the second time, a request for the web page, wherein the web page is configured to detect a second user interaction;

provide the web page to the user device, and, when the second user interaction is detected, automatically customize the web page according stored templates associated with disparate services enabled by the web page, the customized web page including an alternative item notification for the user that identifies the first item, the selected alternative item, the review status of the selected alternative item, and at least some contextual information indicating that the alternative item notification is being provided because the alternative item has an associated review status more positive than the review status of the first item;

transmit the customized web page to the user device;

access information specifying outside systems associated with third party entities that subscribe to item notifications;

generate one or more item notifications describing at least the selected alternative item and review status of the selected alternative item; and provide the generated item notifications to respective outside systems, such that users of the outside systems can complete purchase of at least the selected item via the computing system without navigating away from web pages generated by the outside systems.

2. The system of claim 1, wherein the review status of the first item is determined based at least partly on an average user rating, a number of user ratings, a number of user reviews, or a type of user reviews.

3. The system of claim 1, wherein the item notification is provided to the user for display in an electronic message, an item display page, an order detail page, a home page, a search page, or a category browse page.

4. The system of claim 1, wherein the user interaction of the user with the electronic catalog is an item purchase or rental.

5. The system of claim 1, wherein at least one of the alternative items is accessed from a browse history associated with the user.

6. A computer-implemented method performed by a computing system comprising hardware and memory, the computing system configured with specific executable instructions, and the method comprising:

monitoring interactions of a user device with respect to an electronic catalog presented on the user device of a user, wherein the monitored interactions include one or more of highlighting of portions of text included in one or more web pages associated with the electronic catalog, cursor dwell positions within the web pages, or eye gaze behavior data;

determining, for a first item available from the electronic catalog, a review status at a particular time associated with a user interaction of the user with the electronic catalog;

accessing a candidate list of one or more alternative items for possible notification to the user;

determining, for individual ones of the one or more alternative items on the candidate list, associated respective review statuses at a second time that is later than the particular time associated with the user interaction, wherein for the individual ones of the one or more alternative items a difference between a review status at the second time and a review status at an origin time associated with the individual alternative item is computed, and wherein a particular alternative item on the accessed candidate list is discarded based on an origin time associated with the particular alternative item being older than a threshold, such that computational resources associated with computing the differences can be conserved;

comparing the review status determined for the first item to the review statuses determined for the one or more alternative items to identify, from the one or more alternative items and based on the monitored interactions of the user, at least one selected alternative item having an associated review status different than the review status of the first item;

receiving, from the user device at a third time that is later than the second time, a request for a web page of the one or more web pages, wherein the web page is configured to detect a second user interaction;

accessing information associated with alternative item notifications, the information indicating that the user subscribed to alternative item notifications; and providing the web page to the user device, and, when the second user interaction is detected, automatically customizing the web page according to stored templates associated with disparate services enabled by the web page, the customized web page including an alternative item notification for the user that identifies the first item, the selected alternative item, and the review status of the selected alternative item, and at least some contextual information indicating why the alternative item notification is being provided, wherein the accessed information associated with alternative item notifications indicates one or more outside systems which subscribe to alternative item notifications provided by the computing system, and wherein the outside systems are configured to present the alternative item notifications, such that users of the outside systems can complete purchases of items via the computing system without navigating away from web pages generated by the outside systems.

7. The computer-implemented method of claim 6, wherein the alternative item notification is provided to the user for display in an item display page, an order detail page, a home page, a search page, a category browse page, or an advertisement.

8. The computer-implemented method of claim 6, wherein the one or more alternative items include at least an item available from the catalog system.

9. The computer-implemented method of claim 6, wherein at least one of the alternative items is accessed from a browse history with respect to the electronic catalog and associated with the user.

10. The computer-implemented method of claim 6, wherein the one or more alternative items are substitute, competing, or replacement items with respect to the first item.

11. The computer-implemented method of claim 6, wherein the review statuses of (1) the first item and (2) individual respective alternative items are determined based at least partly on an average user rating, a number of user ratings, a number of user reviews, or a type of user reviews.

12. The computer-implemented method of claim 6, wherein the user interaction of the user with the electronic catalog is an item view interaction.

13. The computer-implemented method of claim 6, wherein the item notification comprises an item recommendation.

* * * * *